(12) United States Patent
Favor et al.

(10) Patent No.: US 7,512,129 B1
(45) Date of Patent: Mar. 31, 2009

(54) METHOD AND APPARATUS FOR IMPLEMENTING A SWITCHING UNIT INCLUDING A BYPASS PATH

(75) Inventors: John G. Favor, Scotts Valley, CA (US); Edmund G. Chen, Sunnyvale, CA (US); Ruchi Wadhawan, Sunnyvale, CA (US)

(73) Assignee: Redback Networks Inc., San Jose, CA (US)

( * ) Notice: Subject to any disclaimer, the term of this patent is extended or adjusted under 35 U.S.C. 154(b) by 1196 days.

(21) Appl. No.: 10/299,236

(22) Filed: Nov. 18, 2002

Related U.S. Application Data

(60) Provisional application No. 60/358,079, filed on Feb. 19, 2002.

(51) Int. Cl.
*H04L 12/28* (2006.01)
*H04J 3/24* (2006.01)
(52) U.S. Cl. .................. 370/394; 370/401; 370/474
(58) Field of Classification Search ............ 370/389, 370/392, 394, 400, 401, 474
See application file for complete search history.

(56) References Cited

U.S. PATENT DOCUMENTS

| | | | |
|---|---|---|---|
| 4,893,304 A * | 1/1990 | Giacopelli et al. .......... 370/411 |
| 5,414,650 A * | 5/1995 | Hekhuis ...................... 708/203 |
| 5,956,721 A * | 9/1999 | Douceur et al. .............. 707/10 |
| 6,157,955 A * | 12/2000 | Narad et al. ................. 709/228 |
| 6,185,568 B1 * | 2/2001 | Douceur et al. .............. 707/10 |
| 6,292,489 B1 * | 9/2001 | Fukushima et al. .......... 370/401 |
| 6,333,933 B1 * | 12/2001 | Yoshizawa et al. .......... 370/389 |
| 6,421,730 B1 * | 7/2002 | Narad et al. ................. 709/236 |
| 6,781,992 B1 * | 8/2004 | Rana et al. ................... 370/394 |
| 6,859,841 B2 * | 2/2005 | Narad et al. ................. 709/236 |
| 6,973,022 B1 * | 12/2005 | Machida et al. ............. 370/216 |
| 7,039,641 B2 * | 5/2006 | Woo ............................ 707/100 |
| 7,349,398 B1 | 3/2008 | Meier et al. |
| 2001/0028650 A1 * | 10/2001 | Yoshizawa et al. .......... 370/389 |
| 2005/0141503 A1 * | 6/2005 | Welfeld ....................... 370/392 |

* cited by examiner

*Primary Examiner*—Hong Cho
(74) *Attorney, Agent, or Firm*—Blakely Sokoloff Taylor & Zafman, LLP

(57) ABSTRACT

A method and apparatus for processing out-of-order processing of packets is described. In one embodiment, the method includes receiving a packet, which is in an original position relative to other packets; and attempting, by a primary processing unit, to classify and process the packet. The method also includes determining whether the packet was completely classified and processed by the primary processing unit; and upon determining that the primary processing unit completely classified and processed the packet, bypassing a secondary processing unit. The method also includes transmitting the packet onto a network, the packet being transmitted in its original position relative to the other packets.

13 Claims, 6 Drawing Sheets

FLOW DIAGRAM 400

METHOD AND APPARATUS FOR IMPLEMENTING A SWITCHING UNIT INCLUDING A BYPASS PATH

CROSS-REFERENCE TO RELATED APPLICATIONS

The present application claims priority to the provisional filed application entitled METHOD AND APPARATUS FOR IMPLEMENTING A SWITCHING UNIT INCLUDING A BYPASS PATH, filed on Feb. 19, 2002, Ser. No. 60/358,079, which is also incorporated herein by reference.

BACKGROUND OF THE INVENTION

1. Field of the Invention

The invention relates to the field of networking. More specifically, the invention relates to the processing packets.

2. Background of the Invention

Packet processing may be implemented using a general purpose processor which performs all algorithms for delivering packets to their destination. However, more advanced packet processors separate "routing" from "switching." The term "routing" used herein refers to determining the best path for packets to travel through a network from their source to their destination, while the term "switching" used herein refers to moving packets from one port to another, within a network element.

FIG. 1 shows a block diagram illustrating a prior art computer network. In this prior art figure, the backbone network 108 is made up of core routers 104a-b. The edge routers 102a-f connect the core routers 104a-b of the backbone network 108 to local area networks 106a-f.

Core routers 104a-b, as compared to edge routers 102a-f, typically perform a lesser amount of packet processing. Typically, when packets reach core routers, advanced packet processing has been completed, leaving only basic packet processing for the core routers. For example, core routers mainly switch packets to other core routers on the backbone network; thus, performing only basic packet header modifications. Because core routers 104 mostly perform only basic packet processing, they can transmit packets faster than edge routers 102.

In contrast, edge routers 102a-d perform more complicated packet processing because they impose the backbone network's traffic constraints and other traffic control requirements on the local area networks 106a-f. For example, a backbone network owner may sell access to a backbone network to different local users. In FIG. 1, the local users make up the local area networks 106a-f. Local users may purchase access packages that allow access to the backbone network 108 at different levels of bandwidth. Edge routers 102 must enforce these bandwidth constraints upon the local area networks 106. For example, if a user's plan allows a user to transmit 10,000 Megabits per second to the backbone network 108, the edge routers 102 must determine whether the user is exceeding its bandwidth constraints, and drop packets accordingly. Because edge routers perform a wide variety of packet processing, they typically have greater processing capabilities, but lower packet throughput than core routers.

FIG. 2 shows a block diagram illustrating a prior art switching unit. The switching unit represents a set of one or more chips on a line card used for processing packets in a network element. The prior art switching unit of FIG. 2 includes classifier circuitry 202, which is connected to a processor queue 204. The processor queue 204 is connected to a processor array 206, which is connected to an output queue 212. The processor array executes software including packet processing software 208 and reorder buffering software 210.

In the prior art switching unit 200, incoming packets enter the classifying circuitry 202, wherein they are classified according to levels of needed processing. The packets are passed to the processor queue 204 before entering the processor array 206. In the processor array 206, the packet processing software 208 processes the packets according to their classifications. For example, a packet classified as a multicast packet is processed according to multicast procedures. Because packet processing may complete out-of-order for an ordered group of packets, and because it is advantageous to maintain order for groups of packets, the reorder buffering software 210 reorders the packets. The packets are transmitted to the output queue 210 and out of the switching unit 200.

A limitation of this prior art switching unit is that all packets travel the same path through the switching unit, regardless of the amount processing needed by each packet. As a result, this prior art switching unit has the disadvantage of sending packets needing very little processing through the processor array 206 and the software reorder buffer 208.

BRIEF SUMMARY OF THE INVENTION

These and other aspects of the present invention will be better described with reference to the Detailed Description and the accompanying figures. A method and apparatus for processing out-of-order processing of packets is described. In one embodiment, the method includes receiving a packet, which is in an original position relative to other packets; and attempting, by a primary processing unit, to classify and process the packet. The method also includes determining whether the packet was completely classified and processed by the primary processing unit; and upon determining that the primary processing unit completely classified and processed the packet, bypassing a secondary processing unit. The method also includes transmitting the packet onto a network, the packet being transmitted in its original position relative to the other packets.

In another embodiment the method comprises receiving at least one micro-flow, which comprises a plurality of packets which are in an original order. The method also comprises attempting, by a primary processing unit, to classify and process ones of the plurality of packets; and determining which of the plurality of packets were completely classified and processed by the primary processing unit. The method also includes for those of the plurality of packets that were not completely classified and processed, completing the classifying and/or processing, by a secondary processing unit; and reordering the completely classified and processed ones of the plurality of packets into their original order; and transmitting the plurality of packets onto a network.

In one embodiment the apparatus comprises a primary processing unit to perform both packet classifying and packet processing operations; and a secondary processing unit to perform both packet classifying and packet processing operations coupled with the primary processing unit. The apparatus also comprises a reorder unit coupled with both the primary processing unit and to the secondary processing unit.

In one embodiment the apparatus includes a primary processing unit, a secondary processing unit, a reorder unit, and an outgoing buffer coupled to the reorder unit. The apparatus also comprises a reorder path to transmit packets from the primary processing unit to the reorder unit. The reorder path includes a processing path to transmit packets from the primary processing unit to the secondary processing unit, and from the secondary processing unit to the reorder unit. The reorder path also includes a bypass path to transmit packet from the primary processing unit to the reorder unit, independent of the secondary processing unit. The apparatus also comprises a non-reorder path to transmit packets from the primary processing unit to the outgoing buffer, avoiding the secondary processing unit and the reorder unit.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Switching Unit with a Bypass Path

Figure 1:
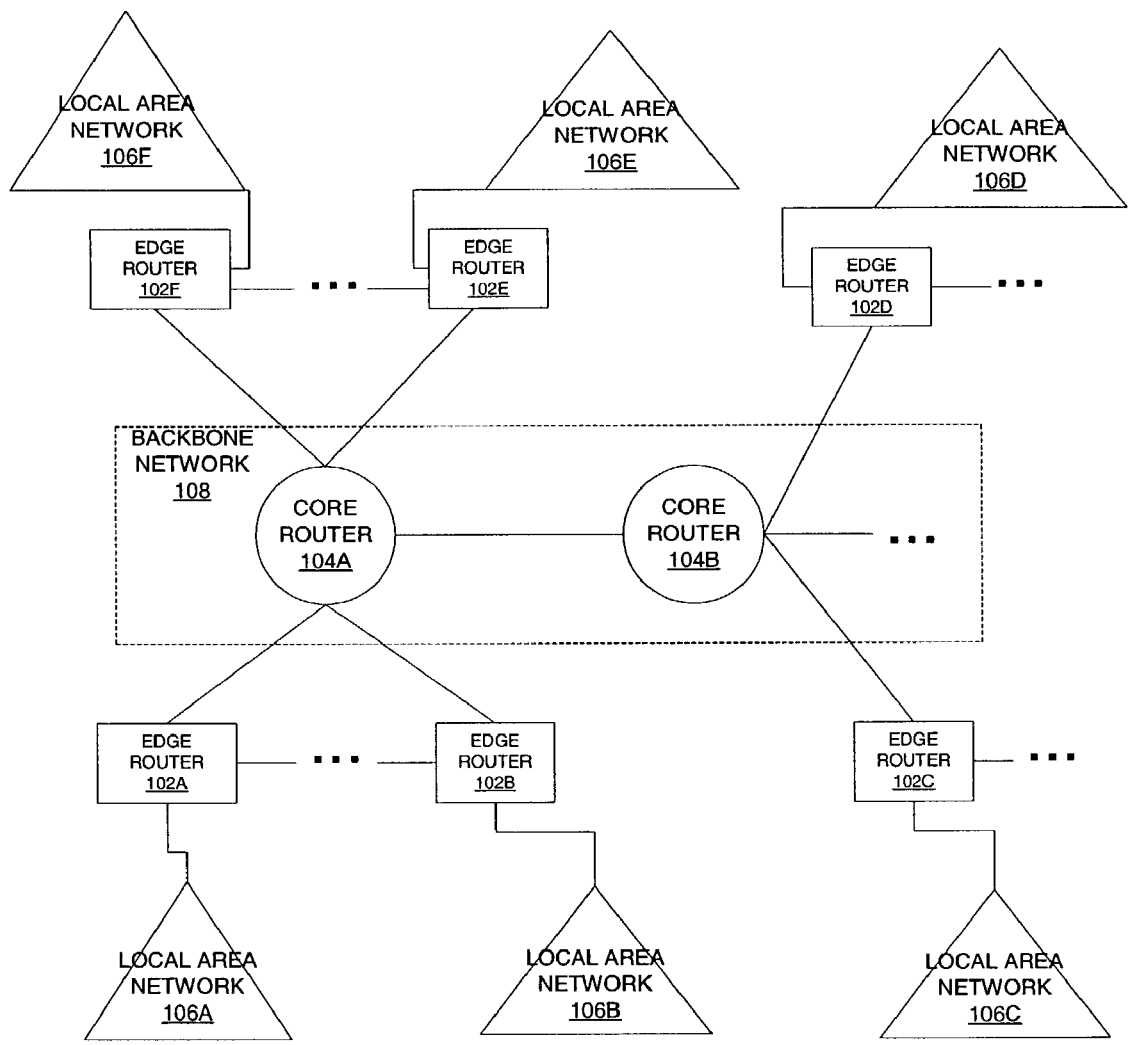
FIG. 1 shows a block diagram illustrating a computer network.
Figure 2:
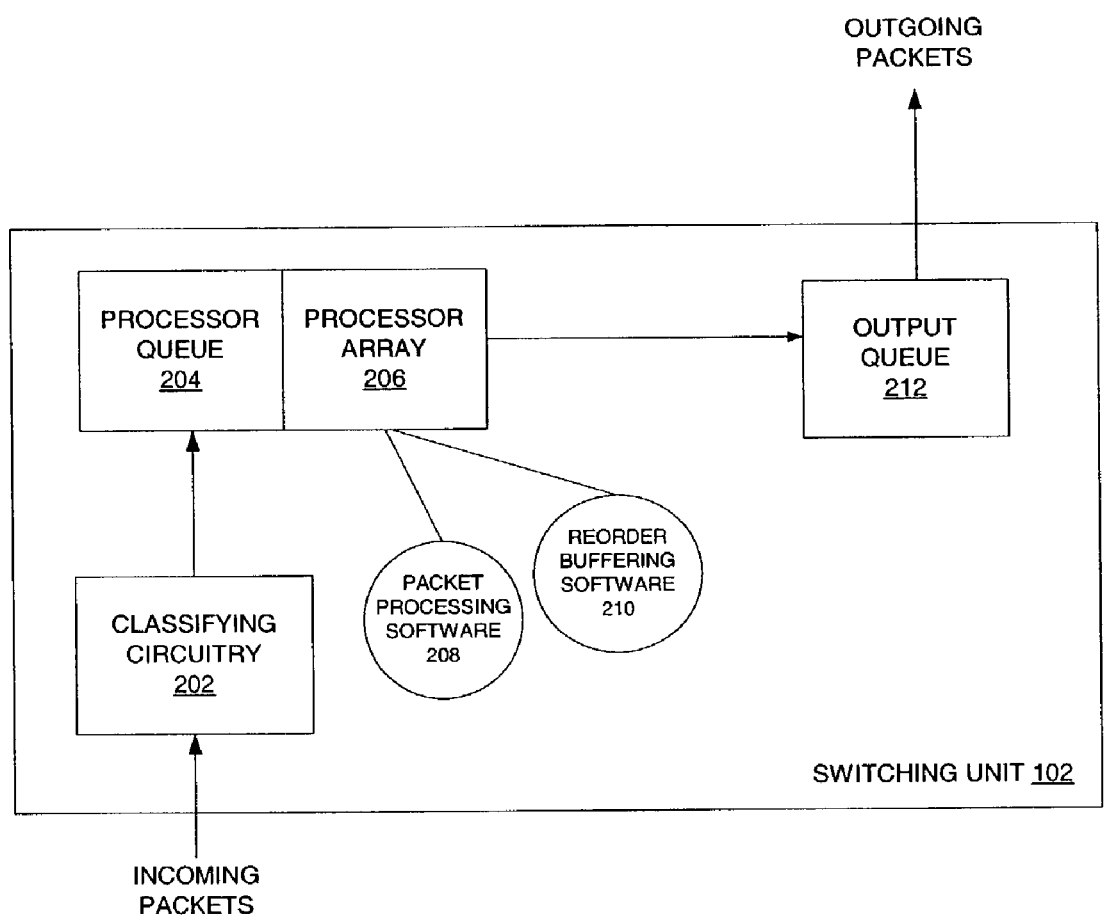
FIG. 2 shows a block diagram illustrating prior art switching unit.
Figure 3:
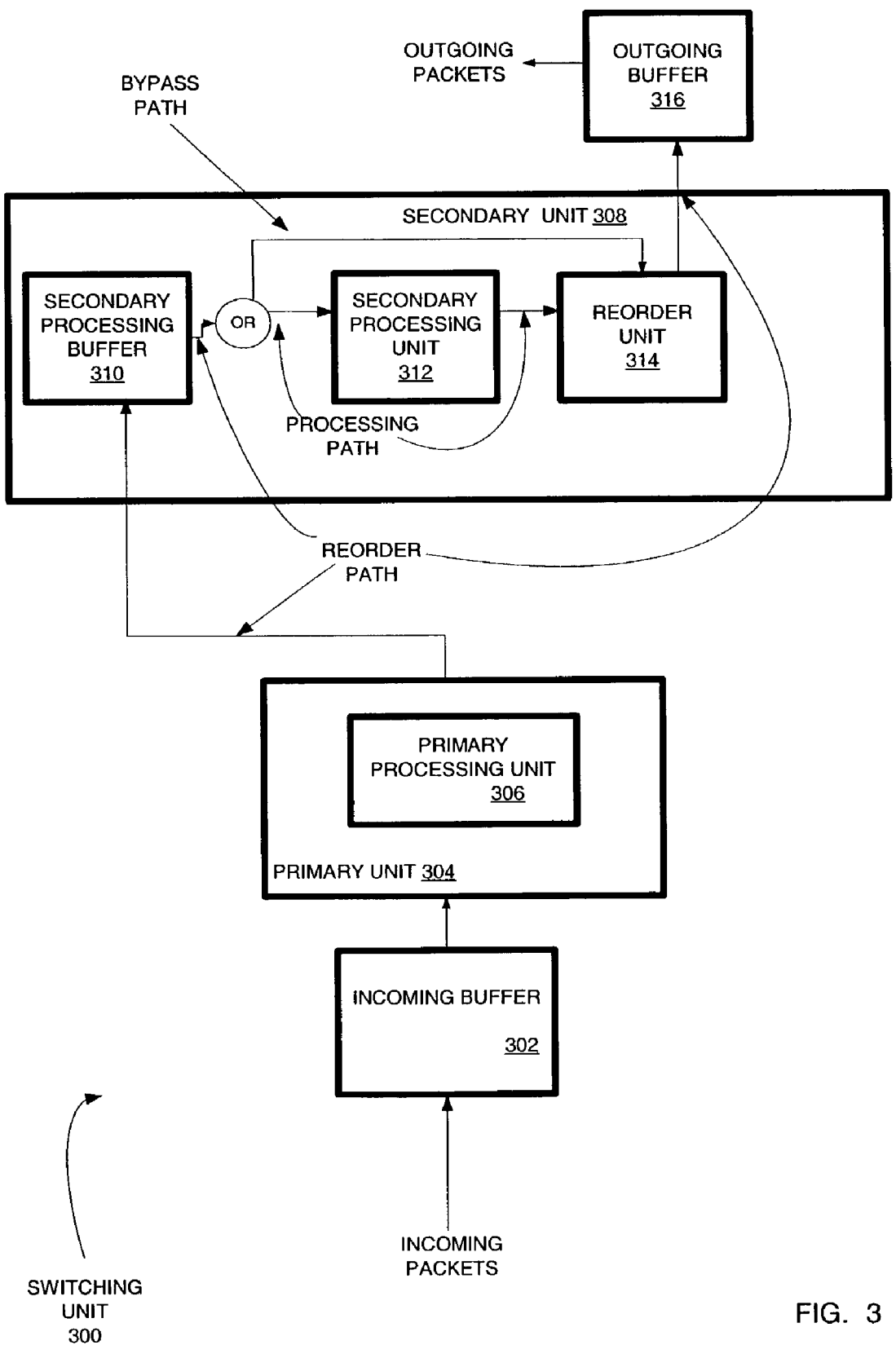
FIG. 3 is a block diagram illustrating an exemplary switching unit 300 in accordance with one embodiment of the invention.
Figure 4:
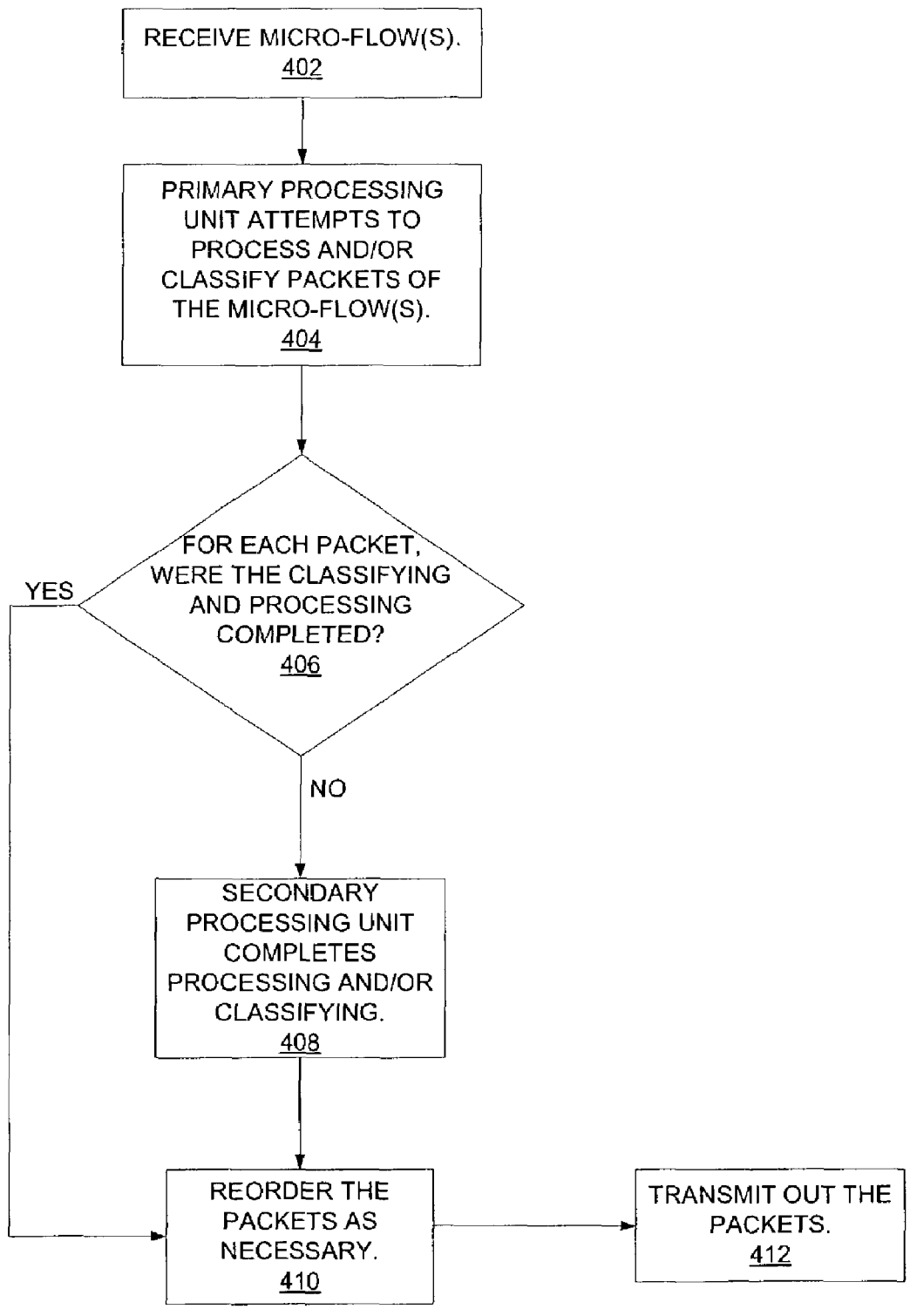
FIG. 4 is a flow diagram illustrating exemplary operations of a switching unit according to one embodiment of the invention.
Figure 5:
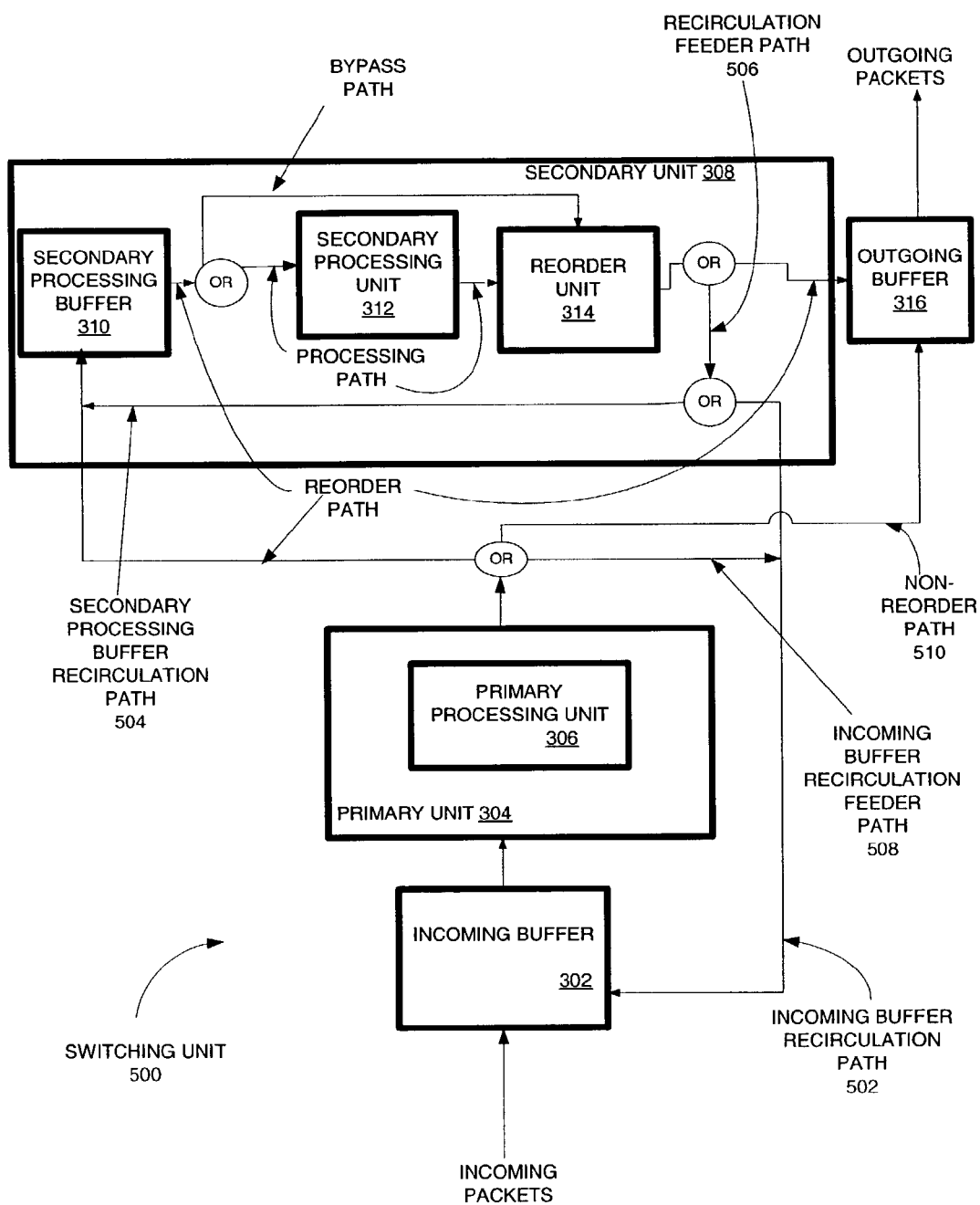
FIG. 5 is a block diagram illustrating an exemplary switching unit 300 in accordance with one embodiment of the invention.
Figure 6:
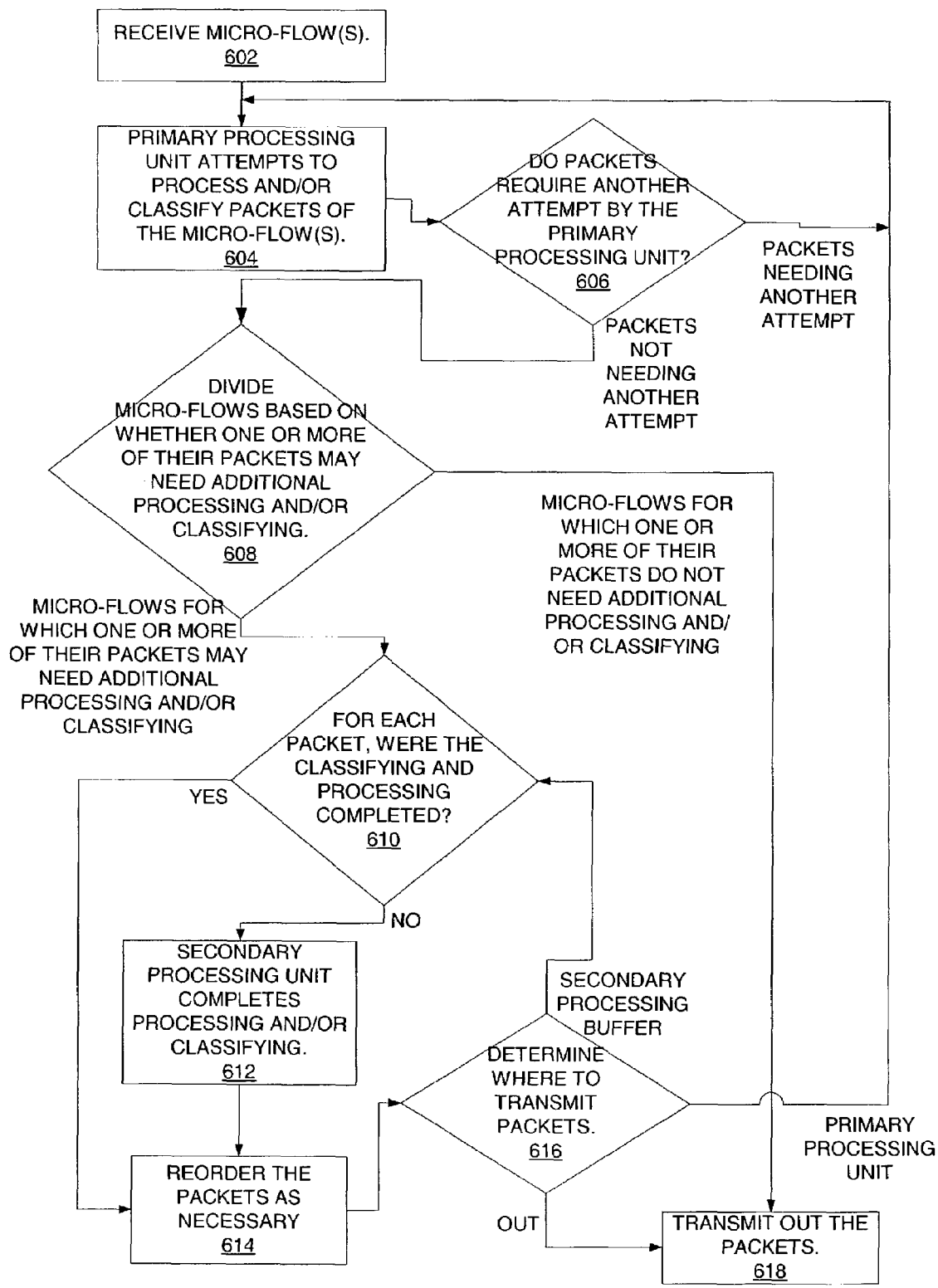
FIG. 6 is a flow diagram illustrating exemplary operations of a switching unit according to one embodiment of the invention.

FIGS. 3 and 5 show block diagrams of exemplary switching units, in accordance with embodiments of the invention. FIGS. 4 and 6 show flow diagrams illustrating operations of exemplary switching units, according to embodiments of the invention. The operations of the flow diagrams will be described with references to the exemplary switching units shown in the block diagrams. However, it should be understood that the operations of the flow diagrams could be performed by embodiments of the switching units other than those discussed with reference to the block diagrams, and embodiments discussed with reference to the switching units could perform operations different than those discussed with reference to the flow diagrams.

FIG. 3 is a block diagram illustrating an exemplary switching unit 300 in accordance with one embodiment of the invention. The exemplary switching unit 300 includes an incoming buffer 302 connected to a primary unit 304. The primary unit 304 includes a primary processing unit 306. A reorder path connects the primary unit 304 with a secondary unit 308, and the secondary unit 308 to an outgoing buffer 316. The secondary unit 308 includes a secondary processing buffer 310, a secondary processing unit 312, and a reorder unit 314. A processing path connects the secondary processing buffer 310 to the secondary processing unit 312, and the secondary processing unit 312 to the reorder unit 314. A bypass path connects the secondary processing buffer 310 to the reorder unit 314, thereby bypassing the secondary processing unit 312.

The reorder unit 314 is connected to the outgoing buffer 316, which is located outside the secondary unit 308. According to embodiments of the invention, the incoming buffer 302, secondary processing buffer 310, and/or outgoing buffer 315 may be single buffers or sets of two or more buffers.

Having described an embodiment of the invention, alternative embodiments of the exemplary switching unit 300 include but are not limited to the following. Instead of standing separately, the incoming buffer 302 could reside within the primary unit 304. Similarly, the outgoing buffer 316 could reside within the secondary unit 308. While in one embodiment, the primary processing unit 306 and the secondary processing unit 312 are each implemented as an array of execution units; in alternative embodiments either one or both may be implemented using other techniques (e.g., specialized processing hardware). While in one embodiment the primary processing unit 306 is implemented to output packets in the order in which it receives them and to operate on each packet for a bounded period of time, alternative embodiments are not implemented this way. The reorder unit 314 could be implemented in any number of ways including software running on a general-purpose processor, or the reorder unit 314 could be implemented in hardware. Moreover, the reorder buffer may be implemented as described in "Method and Apparatus For Out-of-Order Processing of Packets" by Stephen Meier, filed on Dec. 31, 2001, serial number unassigned, which is herein incorporated by reference. Alternatively, the incoming buffer 302, outgoing buffer 316, and secondary unit 308 could be on one chip, while the primary processing unit is on another chip, where the components intercommunicate.

FIG. 4 is a flow diagram illustrating exemplary operations of a switching unit according to one embodiment of the invention. The operation of the flow diagram of FIG. 4 will be described with reference to the exemplary switching unit of FIG. 3.

As shown in block 402, micro-flow(s) are received. With reference to the exemplary embodiment in FIG. 3, switching unit 300 receives micro-flow packets in the incoming buffer 302. From block 402 control passes to block 404.

In block 404, the primary processing unit attempts to process and/or classify packets of the micro-flow(s). For example, the incoming buffer 302 forwards the packets' headers to primary unit 304, where the primary processing unit 306 attempts to process and/or classify the corresponding packets. In the exemplary embodiment of FIG. 3, the primary processing unit 306 is executing packet processing software and packet classifying software (not shown); thus, the primary processing unit 306 can perform various processing operations including packet classifying and packet processing operations. In one embodiment, classifying is determining characteristics about packets. For example, classifying operations may include determining a packet's priority, forwarding destination, context, or other characteristics. In one embodiment, packet processing includes operations for modifying packet headers. From block 404 control passes to block 406.

As shown in block 406, it is determined for each packet whether the classifying and processing were completed. If it is determined that the classifying and processing were completed, control passes to block 410. Otherwise, control passes to block 408. With reference to FIG. 3, if it is determined in block 406 that the processing and/or classifying is not complete for a given packet, that packet is sent down the processing path such that it travels through the secondary processing unit 312 before reaching the reorder unit 314. Otherwise, the given packet is sent around the secondary processing unit 312 to the reorder unit via the bypass path. Various techniques can be used to make the determination in block 406. For example, according to one embodiment of the invention, the primary processing unit 306 marks a field in each packet header indicating whether the corresponding packet has been completely classified and processed. In addition to marking the packet field, the primary processing unit 312 may append a tag onto the packet. The tag would indicate the results of any unfinished classifying and/or processing, so that the results may be used later. After marking each packet header and/or appending the tag onto the packet, the primary processing unit 306 transmits the packet headers down the reorder path to the secondary processing buffer 310. Based on the indication made by the primary processing unit 306, the secondary processing buffer 310 determines whether each packet was completely classified and processed.

As another example, according to an alternative embodiment of the invention, the primary processing unit 306 transmits a signal to the secondary processing buffer 310 indicating which packets have been completely processed. As the secondary processing buffer 310 receives packet headers from the primary processing unit 306, the secondary processing buffer 310 determines which packets have been completely processed based on the signal. As another example, after receiving the packet headers from the primary processing unit 306, the secondary processing buffer 310 determines whether each packet was completely classified and processed based on how the packet was classified. As a more specific example, if a packet were classified as requiring fragmentation, multicasting, or other processing performed by the secondary processing unit 312, the secondary processing buffer 310 would determine that the classifying and/or processing for the packet has not been completed; thus sending the packet down the processing path.

In block 408, the secondary processing unit completes processing and/or classifying the packets. For example, the secondary processing buffer 310 transmits headers of packets that have not been completely classified and processed over the processing path to the secondary processing unit 312. The secondary processing unit 312 completes the needed packet classifying and/or processing. Such needed packet classifying and/or processing may include classifying and/or processing necessary for operations such as multicasting, fragmenting, complex encapsulation or decapsulation, and determining quality of service.

As shown at block 410, the packet headers are reordered as necessary. Control passes from block 410 to block 412. In the example of FIG. 3, packet headers are provided to the reorder buffer unit 314 through both the bypass path and the processing path. These packet headers may be out-of-order in which they should be transmitted out to the outgoing buffer 316 (e.g., because packet processing by the second processing unit may complete out-of-order, because certain packets go over the bypass path, etc.) The reorder unit 314 can reorder the corresponding packets based on any number of criteria. For example, according to one embodiment of the invention, the reorder unit 314 can reorder the packets of each microflow such that they are placed in the order in which they were received. According to an alternative embodiment of the invention, the reorder unit 314 can place packets received on a particular line card into the order in which they were received on that line card. According to another embodiment of the invention, the reorder unit 314 can reorder packets received from a through a given port into the order in which the packets were received from that port.

In block 412, the packets are transmitted out. For example, the outgoing buffer 316 forwards packets out of the switching unit 300.

One advantage of the switching unit 300 is that it switches packets relatively fast. As can be seen from above, the switching unit 300 includes two processing units. Instead of having a first classifying circuitry that only performs packet classification operations, the primary processing unit 306 of switching unit 300 performs certain amounts of and/or certain types both of packet classifying and packet processing operations. Furthermore, instead of having a second processor array that does not perform packet classifying operations, the secondary processing unit 312 of switching unit 300 performs both packet classifying and packet processing operations. Therefore, the packet classifying and packet processing capabilities of the switching unit 300 may be shared between the primary processing unit 306 and the secondary processing unit 312. Because the primary processing unit 306 can perform certain amounts of and/or certain types of both packet classifying and packet processing operations, it may completely classify and process those packets requiring only such amounts and/or types. In one embodiment, if the primary processing unit 306 does not completely classify and/or process a packet, it sends the results of its operations to the secondary processing unit 312 (e.g., it appends a tag onto the packet). The bypass path allows packets that have been completely classified and processed by the primary processing unit 306 to bypass the secondary processing unit 312. Therefore, the secondary processing unit 312 does not expend resources on packets that have already been completely classified and processed. Consequently, the switching unit 300 can switch packets faster, and it can switch a greater amount of packet traffic.

The switching unit 300 described with reference to FIGS. 3 and 4 provides a versatility of operation, as it can operates in either a core router environment or an edge router environment. As noted above, core routers most often perform basic packet header modifications. When operating in a core router environment, the switching unit's primary processing unit 306 typically performs all classifying and processing necessary for forwarding packets to other core routers. After the primary processing unit 306 attempts to classify and processes packets, it sends most packet headers down the bypass path; thus, avoiding the secondary processing unit 312.

As mentioned above, edge routers often perform advanced packet processing. When the switching unit 300 is operating in an edge router environment, typically, both the primary processing unit 306 and the secondary processing unit 312 are needed to perform the classifying and processing necessary for transmitting packets through the network. Consequently, after the primary processor attempts to classify and process packets, it sends most of the packet headers down the processing path.

In both the core and edge router environments, the switching unit 300 can be configured according to a number of configurations. For example, in one configuration, the switching unit 300 can be set up to dynamically choose whether to transmit the packet headers down the processing path or the bypass path based on some criteria. In other configurations either the bypass path or processing path is disabled. The various paths can be disabled any number of ways including being disabled by software running on the switching unit 300. Alternatively, flipping a switch or removing a fuse can disable one or more paths. With the bypass path disabled, the secondary processing buffer 310 transmits all packet headers down the processing path into the secondary processing unit 312. With the processing path disabled, the secondary processing buffer 310 transmits all packet headers down the bypass path, bypassing the secondary processing unit 312.

While embodiments of the invention are described with reference to FIGS. 3 and 4, alternative embodiments that include additional connectivity to allow for greater versatility are described with reference to FIGS. 5 and 6. While various different connections are described, it should be understood that alternative embodiments do not need to include all of these connections; that is, alternative embodiments may include one or more these connections.

Switching Unit with a Bypass Path and Recirculation Paths

FIG. 5 is a block diagram illustrating an exemplary switching unit 500 in accordance with one embodiment of the invention. FIG. 5 is similar to FIG. 3, but several connections for transmitting packet headers have been added. Because FIG. 5 is similar to FIG. 3, only the added connections will be described. The primary unit 304 is connected to the outgoing buffer 316 by a non-reorder path 510. The primary unit 304 is also connected to the incoming buffer 302 by an incoming buffer recirculation feeder path 508 that feeds an incoming buffer recirculation path 502. The reorder unit 314 is connected to the secondary processing buffer 310 by a recirculation feeder path 506 that feeds into a secondary processing buffer recirculation path 504. The reorder unit 314 is also connected to the incoming buffer 302, as the recirculation feeder path 506 also feeds into the incoming buffer recirculation path 502.

FIG. 6 is a flow diagram illustrating exemplary operations of a switching unit according to one embodiment of the invention. The operation of the flow diagram of FIG. 6 will be described with reference to the exemplary switching unit of FIG. 5.

As shown in block 602, micro-flow(s) are received. With reference to the exemplary embodiment in FIG. 5, the switching unit 500 receives micro-flow packets in the incoming buffer 302. From block 602, control passes to block 604.

In block 604, the primary processing unit 306 attempts to process and/or classify packets of the micro-flow(s). From here, control passes to block 606. For example, the incoming buffer 302 forwards the packets to the primary processing unit 306, where the primary processing unit 306 attempts to classify and process the packets.

At block 606, it is determined whether packets require another attempt by the primary processing unit. For packets needing another attempt, control continues at block 604. Otherwise control continues at block 608. For example, the primary processing unit 306 determines whether packets require an additional attempt at classifying and/or processing the packet. For packets that need an additional attempt, the primary processing unit 306 transmits their headers back to the incoming buffer 302 over the incoming buffer recirculation path 502. The incoming buffer 302 will forward the headers to the primary processing unit 306, where the primary processing unit 306 will again attempt to classify and process the corresponding packets. The primary processing unit 306 may recirculate packet headers back to the incoming buffer 302 in instances where it has a limited amount of time to attempt to classify and process packets. When the time for classifying and/or processing expires, if more classifying and/or processing by the primary processing unit 306 are needed, the primary processing unit 306 recirculates the packet headers so it may attempt again. Alternatively, the primary processing unit may recirculate packet headers back to the incoming buffer 302 when packet encapsulation/decapsulation operations result in a new packet header being added/exposed. The packet is recirculated so it can be reclassified based on its new header.

As shown at block 608, the micro-flows are divided based on whether one or more their packets may need additional processing and/or classifying. For micro-flows for which one or more packets may need additional processing and/or classifying, control continues at block 610. Otherwise control continues at block 618. For example, the primary processing unit 306 determines whether one or more packets in a micro-flow may need additional processing. If packets in a micro-flow never need additional processing, the primary processing unit 306 transmits the packets headers of the micro-flow over the non-reorder path 510. Otherwise, the primary processing unit 306 transmits the packets headers of the micro-flow over the reorder path. The primary processing unit 306 divides micro-flows to avoid expending additional time and resources on those micro-flows in which every packet will be completely classified and processed by the primary processing unit 306, and to ensure that those micro-flows containing packets needing additional classifying and processing are sent to the secondary processing unit 312.

Various techniques can be used to make the determination in block 608. For example, according to one embodiment of the invention, the primary processing unit 306 makes the determination based on the environment of the network elements that transmitted the micro-flows to the switching unit 500 and the destinations of the micro-flows or the environment in which the switching unit 500 is operating (e.g., the core or edge of the network). More specifically, if micro-flows were received from a core router, the switching unit 500 would transmit them over the non-reorder path 510, so long as no packets needed additional packet classifying and/or processing for transmission through the proper outgoing port (e.g., so long as fragmentation was not required for sending the packets though the proper port). If the switching unit 500 is operating as an edge router, it would likely transmit the packets over the reorder path because significant packet operations are typically performed by edge routers. Different embodiments of the invention may use different levels of granularity to ensure that micro-flows are divided properly. For example, at one granularity level, the switching unit 500 divides micro-flows based on the line card through which the micro-flows arrived. As a more specific example, the switching unit 500 may determine that all micro-flows arriving on a particular line card may contain packets needing additional classifying and processing; thus, it sends those micro-flows down the reorder path. Alternatively, the switching unit 500 may send all micro-flows arriving through a particular line card down the non-reorder path 512 because the micro-flows' packets do not need additional classifying and processing. As another example, at another granularity level, the switching unit 500 divides micro-flows based on the port through which they arrived. As another example, at another granularity level, the switching unit 500 groups micro-flows together based on some other attribute or classification results.

In block 610, it is determined for each packet whether the classifying and processing were completed. Control continues at block 614 for packets for which classifying and processing has completed. Otherwise control continues at block 612. The operation of block 610 with reference to the exemplary switching unit of FIG. 5 is similar to the operation of block 406 of FIG. 4 with reference to the exemplary switching unit of FIG. 3. The operation of block 406 of FIG. 4 with reference to the exemplary switching unit of FIG. 5 is described above.

As shown in block 612, the secondary processing unit completes classifying and/or processing the packets. Control continues at block 614. The operation of block 612 with reference to the exemplary switching unit of FIG. 5 is similar to the operation of block 408 of FIG. 4 with reference to the exemplary switching unit of FIG. 3, as described above.

In block 614, the packets are reordered as necessary. Control continues at block 616. The operation of block 614 with reference to the exemplary switching unit of FIG. 5 is similar to the operation of block 410 of FIG. 4 with reference to the exemplary switching unit of FIG. 3, as described above.

As shown in block 616, it is determined where to transmit the packets. If the packets are to be transmitted to the secondary processing buffer 310, control continues at block 610. If the packets are to be transmitted to the primary processing unit 306, control continues at block 604. If the packets are to be transmitted out of the switching unit, control continues at block 618. With reference to FIG. 5, the reorder unit 314 can recirculate packets to these locations, and the level of granularity with which it does so is a design choice (see previous description of exemplary levels of granularity). Various techniques can be used to make the determination in block 616. For example, the reorder unit 314 can base its determination of where to transmit the packet headers on some indication within the packet header. More specifically, the primary processing unit 306 or the secondary processing unit 312 could mark a field within the packet header indicating where the reorder unit 314 is to send the packet header. Alternatively the reorder unit 314 could receive signals indicating where to transmit the packets. Thus, any suitable technique could be used to make the determination in block 610.

Referring to the exemplary embodiment of FIG. 5, upon deciding where packets are to be transmitted, the reorder unit 314 transmits the packets to the determined destination. For example, if the reorder unit 314 were to transmit packets to the secondary processing buffer unit 310, it would send the packets over the recirculation feeder path 502 into the secondary processor buffer recirculation path 504, which would convey the packets into the secondary processing buffer 310. In particular, the secondary processor buffer 310 may send packets to the secondary processing buffer 310 after the secondary processing unit 312 performs encapsulation or decapsulation operations. In one embodiment, when a packet undergoes encapsulation or decapsulation, the packet may be sent back to the secondary processing buffer 310 to be reclassified by the secondary processing unit 312 based on the new header. As another example, if the reorder unit 314 were to transmit the packets to the incoming buffer 302, it would transmits the packets over the recirculation feeder path 502 into the incoming buffer recirculation path 502, which would convey the packets into the incoming buffer 302. In particular, the reorder unit 314 may send network maintenance packets, created by the secondary processing unit 312, over the incoming buffer recirculation path 502 to the incoming buffer. Typically, these network maintenance packets are created for collecting information about the network state and must be classified and processed before being sent out of the switching unit 500. As noted above, packets can be grouped according to various levels of granularity. When packets are grouped, the reorder unit 314 can send particular packet groups to any of these destinations. Even when certain packets are recirculated, the packets of a group are transmitted out of the switching unit 500 in the group's original order.

In block 618, the packets are transmitted out of the switching unit. For example, the reorder unit 314 transmits the packets over the reorder path into the outgoing buffer 316. The outgoing buffer 316 transmits the packets out of the switching unit 500.

Thus, various connections have been described with reference to embodiments shown in FIGS. 5 and 6. However, it should be understood that all of these connections need not be present and/or utilized. For example, certain embodiments do not have a secondary processing buffer recirculation path 504. Alternatively, certain embodiments do not have an incoming buffer recirculation path 502. The switching unit 500 described with reference to FIGS. 5 and 6 offers versatility of operation, as it can operate in a core router environment or an edge router environment.

As previously described, core routers tend to perform less intensive packet processing. When operating in a core router environment, the switching unit 500 can be set up according to a number of configurations. For example, in one configuration, the reorder path is disabled. The various paths can be disabled any number of ways including being disabled by software running on the switching unit 500. Alternatively, flipping a switch or removing a fuse can disable one or more of the paths. With the reorder path disabled, the primary processing unit 306 performs all necessary packet classifying and processing, and transmits all packet headers to the outgoing buffer 316 over the nonreorder path.

In this configuration, the primary processing unit 306 can utilize the incoming buffer recirculation path 502. To avoid delays, the primary processing unit 306 may perform packet classifying and/or processing operations on each packet for a limited amount of time. If that time expires before packets are completely classified and processed, the primary processing unit 306 can transmit the packets' headers over the incoming buffer recirculation path 502, so they can be classified and/or processed again. Alternatively, the primary processing unit 306 may recirculate packet headers back to the incoming buffer 302 when a packet encapsulation/decapsulation operation causes a new packet header to be added/exposed. The packet is recirculated so it can be reclassified based on its new header. Incoming packets may be grouped at various levels of granularity, as described above. For packets of a group that are recirculated back to the incoming buffer 302, order is maintained between the packets of that group. That is, when certain packets of a group are recirculated, other packets of the same group are not transmitted to the outgoing buffer 315 ahead of those packets. Consequently, the packets of a group are transmitted out of the switching unit 500 in the order in which they were received relative to each group. In this configuration, the other recirculation paths could not be utilized.

In another configuration, the switching unit 500 can be set up to dynamically choose whether to send packet headers down the reorder path or the non-reorder path 510 based on some criteria. In the core router environment, despite being able to dynamically choose between the reorder path and the non-reorder path 510, the primary processing unit 306 sends most packets down the non-reorder path 510.

When running in an edge router environment, the switching unit 500 can be set up in a number of configurations. As described above, edge routers perform intensive packet processing. In one configuration, the switching unit can be set up such that the non-reorder path 510 is disabled. Such a configuration operates similarly to the similar core router configuration described above. This configuration can utilize the recirculation paths as described above with reference to the core router environment, and as described below with reference to the edge router environment.

In another configuration, the switching unit 500 can be set up to dynamically choose whether to send packet headers down the reorder path or the non-reorder path 510 based on some criteria. As described above, one such criterion can be to send all packets of a micro-flow down the same path based on whether one or more of the packets may need additional processing. Under a different criterion, if order need not be preserved, the primary processing unit can send completely classified and processed packets down the non-reorder path 510, while sending those needing more work down the reorder path. Thus, transmitting out completely classified and processed packets more quickly.

In this configuration, all of the recirculation paths could be utilized. For example, the reorder unit 314 can transmit packet headers back to the secondary processor over the secondary processing buffer recirculation path 504, as described above. As another example, the reorder unit 314 can transmit packet headers to the incoming buffer over the incoming buffer recirculation path 502. In particular, the reorder unit 314 may send network maintenance packets, created by the secondary processing unit 312, over the incoming buffer recirculation path 502 to the incoming buffer, as described above. 500 As another example, the primary processing unit 306 can utilize the incoming buffer recirculation path 502, as described above.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. An apparatus comprising:
   a primary processing unit to perform both packet classifying and packet processing operations;
   an incoming buffer coupled with the primary processing unit;
   a secondary processing unit to perform both packet classifying and packet processing operations;
   a reorder unit coupled with the secondary processing unit;
   a secondary processing buffer coupling the primary processing unit with the secondary processing unit;
   a bypass path to transmit packets from the primary processing unit to the reorder unit, independent of the secondary processing unit; and
   an outgoing buffer coupled with the reorder unit.

2. The apparatus of claim 1 wherein the outgoing buffer is coupled with the primary processing unit.

3. The apparatus of claim 1 wherein the reorder unit is coupled with the incoming buffer.

4. The apparatus of claim 1, further comprising:
   an incoming buffer recirculation feeder path coupled with an incoming buffer recirculation path to transmit packets from the primary processing unit to the incoming buffer.

5. The apparatus of claim 1, further comprising:
   a recirculation feeder path coupled with a secondary processing buffer recirculation path to transmit packets from the reorder unit to the secondary processing buffer.

6. The apparatus of claim 5, wherein the recirculation feeder path is coupled with a incoming buffer recirculation path to transmit packets from the reorder unit to the incoming buffer.

7. An apparatus comprising:
   a primary processing unit;
   a secondary processing unit;
   a reorder unit;
   an outgoing buffer coupled to the reorder unit;
   a reorder path to transmit packets from the primary processing unit to the reorder unit, the reorder path including,
      a processing path to transmit packets from the primary processing unit to the secondary processing unit, and from the secondary processing unit to the reorder unit; and
      a bypass path to transmit packets from the primary processing unit to the reorder unit, independent of the secondary processing unit; and
   a non-reorder path to transmit packets from the primary processing unit to the outgoing buffer, avoiding the secondary processing unit and the reorder unit.

8. The apparatus of claim 7 further comprising:
   a first recirculation path to transmit packets from the reorder unit to the primary processing unit; and
   a second recirculation path to transmit packets sent out of the primary processing unit back to the primary processing unit.

9. The apparatus of claim 7 further comprising:
   an incoming buffer coupled with the primary processing unit; and
   a secondary processing buffer coupled with the primary processing unit and the secondary processing unit.

10. The apparatus of claim 7 wherein the reorder path connects the primary processing unit to the secondary processing buffer, and the reorder unit to the outgoing buffer.

11. A packet classifying and processing apparatus comprising:
    a primary processing unit to perform both packet classifying and packet processing operations;
    a secondary processing buffer coupled to the primary processing unit;
    a secondary processing unit coupled to the secondary processing buffer;
    a reorder unit coupled to both the secondary processing buffer and the secondary processing unit;
    a first recirculation path to transmit packets from the reorder unit to the primary processing unit;
    a second recirculation path to transmit packets sent out of the primary processing unit back to the primary processing unit;
    a bypass path to transmit a packet from the primary processing unit to the reorder unit, independent of the secondary processing unit; and
    an outgoing buffer coupled to the reorder unit.

12. The apparatus of claim 11 wherein the primary processing unit is also coupled to the outgoing buffer.

13. The apparatus of claim 12 further comprising a third recirculation path to transmit packets from the reorder unit to the secondary processing buffer.

* * * * *